United States Patent
Jensen et al.

(10) Patent No.: US 11,877,369 B2
(45) Date of Patent: Jan. 16, 2024

(54) ADJUSTING A COLOR MIXING SYSTEM DEPENDING ON BEAM CLIPPING

(71) Applicant: HARMAN PROFESSIONAL DENMARK APS, Aarhus N (DK)

(72) Inventors: Frank Kjaer Jensen, Skødstrup (DK); Kasper Nielsen, Brabrand (DK)

(73) Assignee: Harman Professional Denmark APS, Aarhus N (DK)

( * ) Notice: Subject to any disclaimer, the term of this patent is extended or adjusted under 35 U.S.C. 154(b) by 12 days.

(21) Appl. No.: 17/692,056

(22) Filed: Mar. 10, 2022

(65) Prior Publication Data
US 2023/0292420 A1 Sep. 14, 2023

(51) Int. Cl.
*H05B 47/105* (2020.01)
*G02B 15/14* (2006.01)
*H05B 45/20* (2020.01)

(52) U.S. Cl.
CPC ......... *H05B 47/105* (2020.01); *G02B 15/145* (2019.08); *H05B 45/20* (2020.01)

(58) Field of Classification Search
CPC ..... H05B 45/20; H05B 47/105; G02B 15/145
See application file for complete search history.

(56) References Cited

U.S. PATENT DOCUMENTS

| 5,045,983 | A | * | 9/1991 | Shields | H05B 47/155 362/268 |
| 2015/0002034 | A1 | * | 1/2015 | van de Ven | H05B 45/60 315/193 |
| 2015/0049307 | A1 | * | 2/2015 | Kashihara | G03B 21/2073 353/31 |
| 2018/0017219 | A1 | * | 1/2018 | Hikmet | G02B 27/283 |
| 2020/0232626 | A1 | * | 7/2020 | Jurik | F21V 23/0457 |

FOREIGN PATENT DOCUMENTS

WO 2010/145658 A1 12/2010

* cited by examiner

*Primary Examiner* — Raymond R Chai
(74) *Attorney, Agent, or Firm* — Artegis Law Group, LLP

(57) ABSTRACT

Techniques for adjusting a color mixing system depending on beam clipping include receiving target information indicative of a target color of light emitted from the light fixture; receiving a beam clipping system setting for a beam clipping system, wherein the beam clipping system is configured to clip a portion of a beam of light; determining a target color mixing system setting based on the target information and the beam clipping system setting; and controlling a color mixing system according to the target color mixing system setting so as to cause the light fixture to emit light having the target color.

20 Claims, 7 Drawing Sheets
(3 of 7 Drawing Sheet(s) Filed in Color)

ADJUSTING A COLOR MIXING SYSTEM DEPENDING ON BEAM CLIPPING

BACKGROUND

Field of the Various Embodiments

The various embodiments relate generally to lighting systems and more specifically to techniques for adjusting a color mixing system depending on beam clipping.

Description of the Related Art

Light fixtures can be utilized for creating various light effects and/or mood lighting in connection with, for example, concerts, live shows, TV shows, sport events or as architectural installation light fixtures creating various effects.

A light fixture with a color mixing system is generally advantageously capable of emitting a desired target color. However, such light fixtures can nevertheless be sub-optimal or imprecise in terms of emitted color and/or inconsistent, such as differing in properties (such as emitted color(s)) across different settings. For example, a light fixture can comprise a subtractive color mixing system with one or more color filters being partially inserted into a light beam at one position along the optical axis within the light fixture to color some of the light in the light beam for the purpose of having the light emitted from the light fixture being of a certain color. However, with a zoom system at a subsequent position along the optical axis within the light fixture, which at different settings causes different degrees of clipping or vignetting, a relatively large portion of light having been colored with the one or more color filters can at some settings be blocked and hence excluded from the light emitted from the light fixture, which in turn makes the color of light emitted from the light fixture change, even for fixed settings of the subtractive color mixing system.

Hence, an improved method for controlling a light fixture and more particularly a method for controlling a color mixing system in a light fixture with an adjustable beam clipping system, for enabling more precisely emitting a target color and/or for enabling increased consistency across different settings and a corresponding control device, light fixture system and method of manufacture, would be advantageous.

SUMMARY

One embodiment sets forth a method for controlling a color of light emitted by a light fixture, the method comprising receiving target information indicative of, such as defining, the target color of light emitted from the light fixture, receiving a beam clipping system setting for a beam clipping system, wherein the beam clipping system is configured to clip a portion of a beam of light, determining a target color mixing system setting based on the target information, and the beam clipping system setting, and controlling the color mixing system according to the target color mixing system setting so as to cause the light fixture to emit light having the target color.

One embodiment sets forth a control device for controlling a color of light emitted by a light fixture, wherein the control device is configured to receive target information indicative of, such as defining, a target color of light emitted from the light fixture, receive a beam clipping system setting for a beam clipping system, wherein the beam clipping system is configured to clip a portion of a beam of light, determine, such as at least partially calculating, a target color mixing system setting based on the target information, and the beam clipping system setting, and control the color mixing system according to the target color mixing system setting so as to cause the light fixture emit light having the target color.

One embodiment sets forth a light fixture system comprising a light fixture is comprising one or more light sources configured to emit light, such as at least a single light source capable of emitting polychromatic, such as broadband, light and/or a plurality of light sources being spectrally different from each other, a beam clipping system configured to clip one or more portions of the light emitted by the one or more light sources, such as a zoom system and/or an iris and/or a gobo, such as wherein the beam clipping system is configured to clip a portion, such as one or more rays, of a beam of light emitted from the one or more light sources so that said portion is not emitted from the light fixture, such as wherein said portion is spatially and/or angularly variable, and such as wherein said portion can be controlled according to a beam clipping system setting, such as wherein the beam clipping system setting is capable of being set according to at least two, such as at least three, different values, a color mixing system configured to emit light of a variable color; such as wherein the color mixing system is configured to emit light from the color mixing system having a color being variable and controlled according to a color mixing system setting, and wherein the light fixture system is further comprising a control device coupled to the beam clipping system and the color mixing system, such as wherein the control device is operationally connected to the color mixing system and configured for controlling the color mixing system, such as by providing the determined target control setpoints to the color mixing system, and wherein the control device is configured to receive target information indicative of a target color of light emitted from the light fixture, receive a beam clipping system setting for a beam clipping system, determine a target color mixing system setting based on: the target information and the beam clipping system setting, control the color mixing system according to the target color mixing system setting so as to cause the light fixture emit light having the target color.

One embodiment sets forth one or more computer-readable storage media including instructions that, when executed by one or more processors, cause the one or more processors to perform steps of receiving target information indicative of a target color of light emitted from the light fixture, receiving a beam clipping system setting for a beam clipping system, wherein the beam clipping system is configured to clip a portion of a beam of light, determining a target color mixing system setting based on the target information and the beam clipping system setting; and controlling a color mixing system according to the target color mixing system setting so as to cause the light fixture to emit light having the target color.

One embodiment sets forth a method of manufacturing a control device according to any of the other embodiments described herein wherein the method comprises obtaining calibration data indicative of a color of light emitted from the light fixture or from a corresponding light fixture for a plurality of coordinates in a multi-dimensional space spanned by color mixing system setting and beam clipping system setting.

One embodiment sets forth use of a light fixture system for emitting a target color according to any of the other embodiments described herein.

At least one technical advantage of the disclosed techniques relative to the prior art is that, with the disclosed techniques, changes in a color of light emitted from a light fixture that would otherwise result from adjustments of a beam clipping system setting, such as adjustments of a zoom level, can be reduced, minimized, or eliminated. The disclosed techniques further allow existing lighting systems to correct for the color changing effects of the clipping by updating the control of an existing color mixing system and without having to add additional components. These technical advantages represent one or more technological improvements over prior art approaches.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
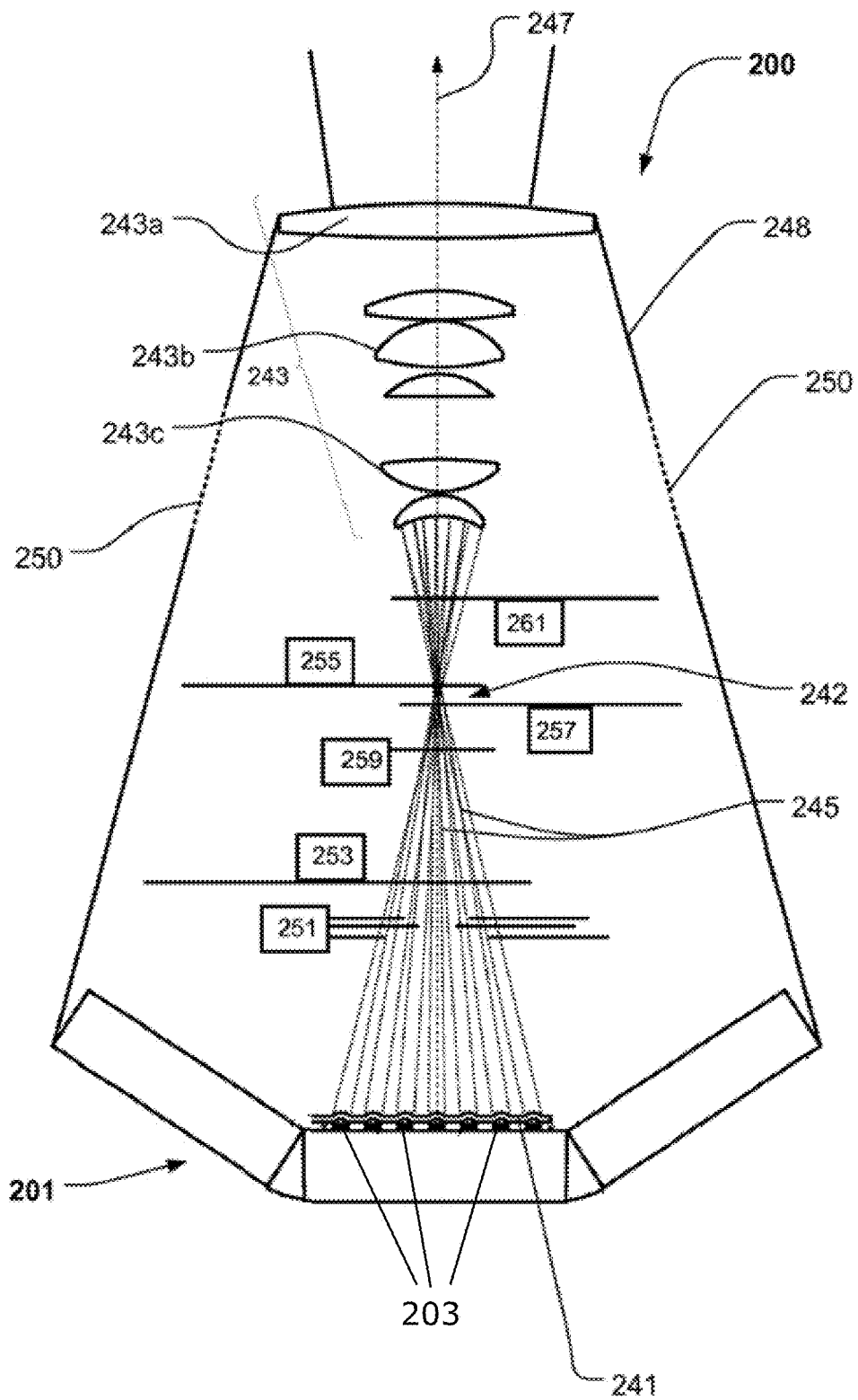
FIG. 1 illustrates a structural diagram of a light fixture according to various embodiments.

FIG. 1 illustrates a structural diagram of a light fixture 200. The light fixture 200 comprises, without limitation, a cooling module 201, a plurality of LEDs 203 (which could in an alternative embodiment be one or more discharge bulbs), a light collector 241, an optical gate 242, and an optical projecting and zoom system 243. The cooling module 201 is arranged in the bottom part of a lamp housing 248 of the light fixture 200 and the other components are arranged inside the lamp housing 248. The lamp housing 248 can be provided with a number of openings 250. The light collector 241 is adapted to collect light from the LEDs 203 and to convert the collected light into a plurality of light beams 245 (dotted lines) propagating along an optical axis 247 (dash-dotted line). The light collector can be embodied as any optical means capable of collecting at least a part of the light emitted by the LEDs 203 and convert the collected light to a light beam. In the illustrated embodiment the light collector comprises a number of lenslets each collecting light from one of the LEDs 203 and converting the light into a corresponding light beam. However, it is noticed that the light collector also can be embodied as a single optical lens, a Fresnel lens, a number of TIR lenses (total reflection lenses), a number of light rods or combinations thereof. It is understood that light beams propagating along the optical axis contain rays of light propagating at an angle, e.g., an angle less than 45 degrees to the optical axis. The light collector 241 can be configured to fill the optical the gate 242 with light from the light sources 203 so that the area, i.e., the aperture, of the gate 242 is illuminated with a uniform intensity or optimized for max output. The gate 242 is arranged along the optical axis 247. The optical projecting system 243 can be configured to collect at least a part of the light beams transmitted through the gate 242 and to image the optical gate at a distance along the optical axis. For example, the optical projecting system 243 can be configured to image the gate 242 onto some object such as a screen, e.g., a screen on a concert stage. A certain image, e.g., some opaque pattern provided on a transparent window, an open pattern in a non-transparent material, or imaging object such as gobos known in the field of entertainment lighting, can be contained within the gate 242 so that that the illuminated image can be imaged by the optical projecting system. Accordingly, the light fixture 200 can be used for entertainment lighting. In the illustrated embodiment the light is directed along the optical axis 247 by the light collector 241 and passes through a number of light effects before exiting the light fixture through a front lens 243a. The light effects can for instance be any light effects known in the art of intelligent/entertainments lighting for instance, a CMY subtractive color mixing system 251, color filters 253, gobos 255, animation effects 257, iris effects 259, a focus lens group 243c, zoom lens group 243b (which can form a beam clipping system), prism effect 261, framing effects (not shown), or any other light effects known in the art. The mentioned light effects only serve to illustrate the principles of an illuminating device for entertainment lighting and the person skilled in the art of entertainment lighting will be able to construct other variations with additional or less light effects. Further it is noticed that the order and positions of the light effects can be changed.

Figure 2:
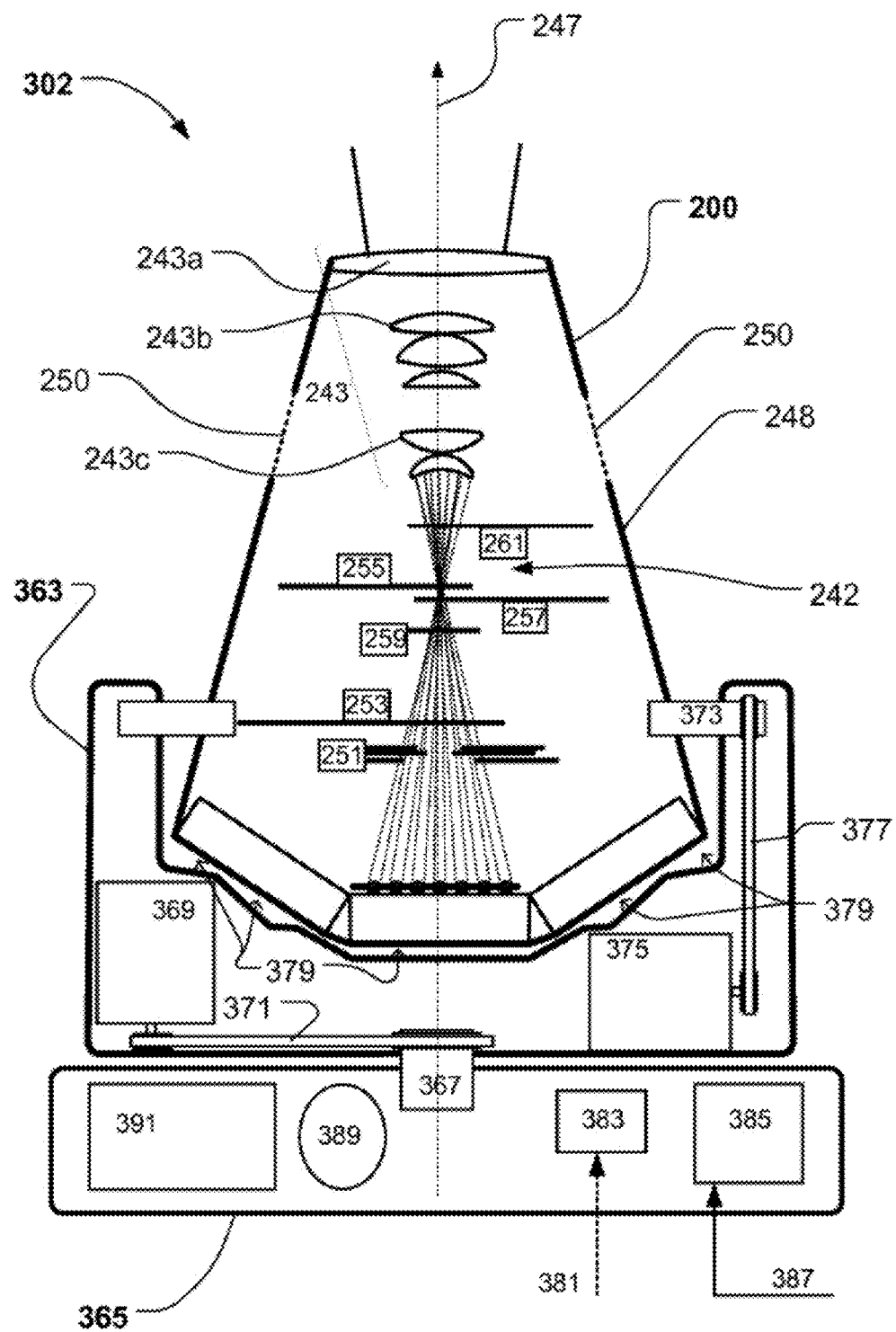
FIG. 2 illustrates a structural diagram of a moving head according to various embodiments.

FIG. 2 illustrates a structural diagram of a moving head 302 comprising a light fixture 200 rotatably connected to a yoke 363 where the yoke is rotatably connected to a base 365 (with the light fixture 200 being substantially identical to the light fixture 200 shown in FIG. 1 and substantial identical features are labeled with the same reference numbers as in FIG. 1 and will not be described further). The moving head 302 comprises pan rotating means for rotating the yoke 363 in relation to the base, for instance by rotating a pan shaft 367 connected to the yoke 363 and arranged in a bearing (not shown) in the base 365). A pan motor 369 is connected to the pan shaft 367 through a pan belt 371 and is configured to rotate the shaft 367 and yoke 363 in relation to the base through the pan belt 371. The moving head 302 comprises tilt rotating means for rotating the light fixture 200 in relation to the yoke 363, for instance by rotating a tilt shaft 373 connected to the light fixture and arranged in a bearing (not shown) in the yoke). A tilt motor 375 is connected to the tilt shaft 373 through a tilt belt 377 and is configured to rotate the tilt shaft 373 and light fixture 200 in relation to the yoke 363 through the tilt belt 377. The pan and tilt rotation means can be constructed in many different ways using mechanical components such as motors, shafts, gears, cables, chains, transmission systems, bearings etc.

Alternatively, it is noticed that it also is possible to arrange the pan motor in the base and/or arrange the tilt motor in the light fixture 200. The space 379 between the yoke 363 and the bottom part of the light fixture 200 is limited as the moving head 302 is designed to be as small as possible. The moving head 302 receives electrical power 381 from an external power supply (not shown). The electrical power is received by an internal power supply 383 which adapts and distributes electrical power through internal power lines (not shown) to the subsystems of the moving head 302. The internal power system can be constructed in many different ways for instance by connecting all subsystems to the same power line. In some embodiments, some of the subsystems in the moving head need different kind of power and that a ground line also can be used. The light source will for instance in most applications need a different kind of power than step motors and driver circuits. The moving head 302 comprises also a control device 385 which controls the components (other subsystems) in the moving head based on an input signal 387 indicative light effect parameters, position parameters and other parameters related to the moving head 302. The control device 385 receives the input signal from a light control device (not shown) as known in the art of intelligent and entertainment lighting for instance by using a standard protocol like DMX, ArtNET, RDM etc. Typically, the light effect parameter is indicative of at least one light effect parameter related to the different light effects in the light system. The control device 385 is adapted to send commands and instructions to the different subsystems of the moving head 302 through internal communication lines (not shown). The internal communication system can be based on a various type of communications networks/systems. The moving head 302 can also comprise user input means enabling a user to interact directly with the moving head instead of using a light control device to communicate with the moving head 302. The user input means 389 can for instance be bottoms, joysticks, touch pads, keyboard, mouse etc. The user input means can also be supported by a display 391 enabling the user to interact with the moving head through a menu system shown on the display using the user input means. The display 391 and user input means can in one embodiment also be integrated as a touch screen.

A "control device" can be a device, such as one or more processors, capable of being operatively connected with a color mixing system and controlling the color mixing system, such as more generally being operatively connected with a light fixture and controlling the light fixture. For example, the control device can be operatively connected to, e.g., an adjustable power supply to each of a group of differently colored light sources in and additive color mixing system and/or one or more actuators for controlling a subtractive color mixing system. Thus, the control device can comprise a processor, an input unit (such as a communication port for receiving target information and beam clipping system setting) and an output unit (such as a communication port for sending a target color mixing system setting and/or for sending a control command for controlling a color mixing system according to a target color mixing system setting).

Figure 3:
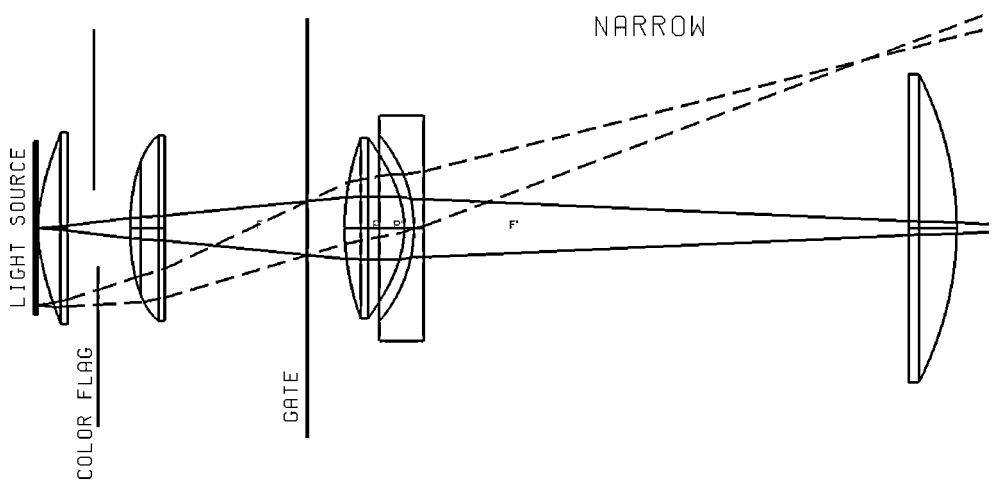
FIGS. 3-5 illustrate ray diagrams for a light fixture according to various embodiments.
Figure 4:
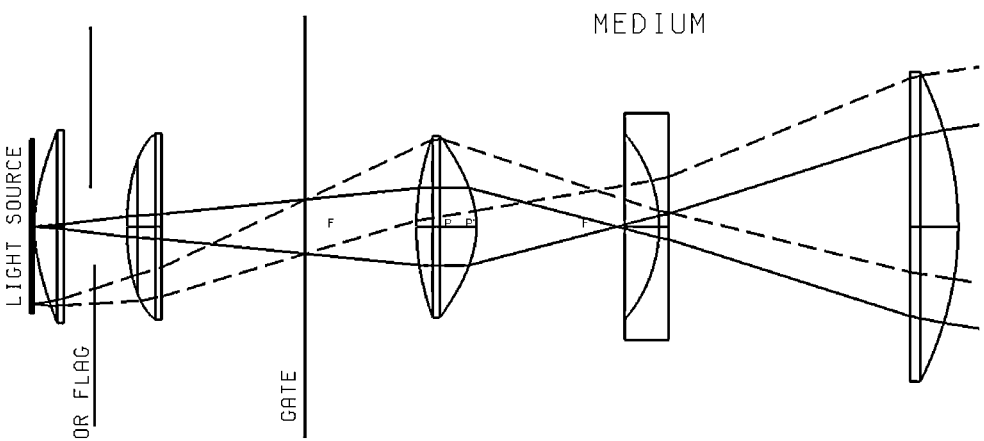
Figure 5:
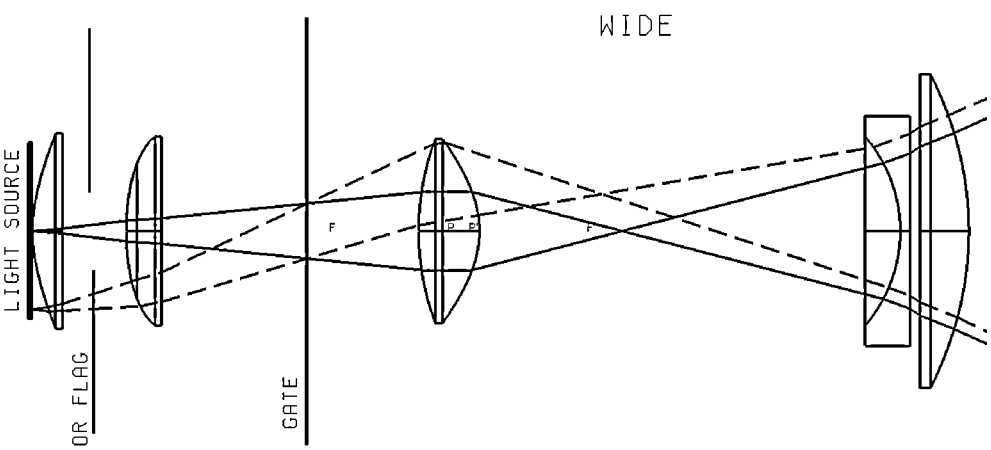

FIGS. 3-5 illustrate ray diagrams for a light fixture according to various embodiments, wherein the beam setting system is a zoom system and wherein the color mixing system is a subtractive color mixing system comprising a color flag (also known as a color filter), which in each case is partially inserted into the beam of light emitted from the light source. More particularly, the light source emits light from a central portion (as indicated by the full drawn ray traces) and from a peripheral portion (as indicated by the dashed ray traces), and the color filter is inserted at a position only coloring the peripheral light.

FIG. 3 illustrates a first beam system setting, which yields a narrow emitted light beam. However, the portion of the beam of light being emitted from the peripheral portion and being colored by the color flag is being clipped by the zoom system. As a result, the light emitted from the light fixture is only the light, which has not been colored by the color flag, and hence has another color than the light exiting the subtractive color mixing system. This difference can be compensated for by taking the beam clipping setting into account and moving the color flag further towards the optical axis thereby coloring some of the light emitted from the central portion of the light source, which makes it through the light fixture and gets emitted from the light fixture.

FIG. 4 illustrates a second beam system setting, which yields a medium (width) emitted light beam. The portion of the beam of light being emitted from the peripheral portion and being colored by the color flag is not being clipped by the zoom system. As a result, the light emitted from the light fixture includes the light, which has been colored by the color flag.

FIG. 5 illustrates a third beam system setting, which yields a wide emitted light beam. The portion of the beam of light being emitted from the peripheral portion and being colored by the color flag is not being clipped by the zoom system. As a result, the light emitted from the light fixture includes the light, which has been colored by the color flag.

More generally, FIGS. 3-5 illustrate that light fixtures with zoom and a color system comprising of color filters that are gradually inserted into the light path, can suffer from changing colors when zooming. This happens when the zoom system cuts off light, depending on zoom setting, and when the color is not homogeneously distributed at a cut-off plane. For a typical zoom light fixture, this will happen at the front lens when the zoom is set to narrow beam. The color filters, which are inserted from the sides, are "imaged" at the front lens, and because the front lens is often chosen to be relatively small (to limit size, weight and cost), it will cut off the light at the sides, which holds the majority of the light that has passed through the color filters, thus effectively cutting off the "color". This will typically not happen at wide beam angles, because here the front lens is big enough. That means that the color will change as a function of the zoom setting, which is an unwanted effect.

To compensate for the color changes that occur when zooming with a luminaire that uses variable color filters, upon characterizing the interaction between the color filters and the zoom, it can be possible to make an algorithm that compensates for the color changes caused by light cut-off in the optics, by varying the color flag insertion. I.e., when the optical system cuts off the light at the edge, where the light is colored from passing through the color filters, the algorithm inserts more of the flag into the beam, to counteract that some of the colored light has been lost, thus keeping the color saturation constant across the zoom range.

Figure 6:
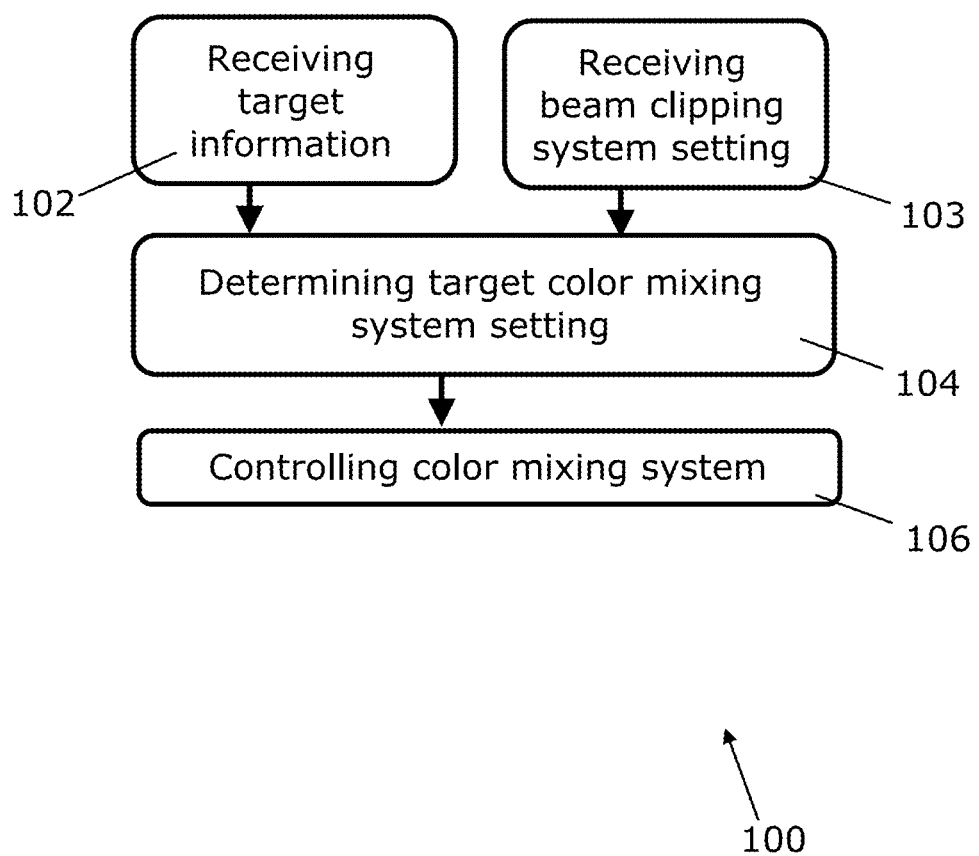
FIG. 6 illustrates a flow-chart of a method according to various embodiments.

FIG. 6 shows a flow-chart of method steps for controlling a color of light emitted by a light fixture, such as wherein the light fixture is comprising one or more light sources, such as at least a single light source capable of emitting polychromatic, such as broadband, light and/or a plurality of light sources being spectrally different from each other and optionally individually controllable, a beam clipping system, such as a zoom system and/or an iris and/or a gobo, wherein the beam clipping system is arranged to clip a portion, such as one or more rays, of a beam of light emitted from the one or more light sources so that said portion is not emitted from the light fixture, wherein said portion is spatially and/or angularly variable, and wherein said portion can be controlled according to a beam clipping system setting, such as wherein the beam clipping system setting is capable of being set according to at least two, such as at least three, different values, a color mixing system, wherein the color mixing system is arranged to emit light from the color mixing system having a color being variable and controlled according to a color mixing system setting.

As shown a method 100 begins at step 102, where target information indicative of, such as defining, a target color to be emitted by a light fixture, such as light fixture 200 and/or moving head 302 is received.

A "target color" is a color desired by a user. The target color can be targeted, e.g., by a control device, in pursuit of the target color, such as in pursuit of emitting light from the light fixture having the target color or being as close as possible to the target color.

In some embodiments, "a target color" is the color of light desired to be emitted from the light fixture. In some embodiments, the target color is generated by traversing light through the beam clipping system and/or the color mixing system), such as a color desired by a user. In some embodiments, the light fixture to controlled so as to emit light having a color similar or identical to the desired target color. The color can be defined with reference to a chromaticity and chromaticity (coordinate) system, such as the CIE (Commission internationale de l'éclairage) 1931 color space.

"Receiving target information" can include any form of user input, such as adjustment via physical controls, such as knobs or keyboards, or analog or digital signals, such as a digitally input chromaticity and chromaticity coordinate in the CIE 1931 color space. In some embodiments, the target information can additionally and/or alternatively be received from another system, such as a control system for a lighting installation.

"Target information indicative of the target color" can be used to derive the target color, such as the target information directly defining the target color (e.g., target information being a coordinate in the CIE 1931 color space) or indirectly defining the target color (e.g., target information being a spectrum of electromagnetic radiation enabling deriving a corresponding target color).

At a step 103, a beam clipping system setting for the beam clipping system is received. In some embodiments, step 103 optionally includes adjusting the beam clipping system accordingly if the beam clipping system is not already adjusted according to the beam clipping system setting. In some embodiments, the beam clipping setting can be received from the beam clipping system, a user, another system, and/or the like.

At a step 104, a target color mixing system setting is determined based on the target information and the beam clipping system setting.

"Determining a target color mixing system setting" can include identifying a setting of the color mixing system, which would result in the target color being emitted from the light fixture. This is based on the target information, and the beam clipping system setting, such as via calibration data, a calculation, a simulation and/or a look-up table. By taking both the target information into account and the beam clipping system setting, it is possible to not only know which target color to aim for, but also to adjust, such as compensate, for the beam clipping system, such as taking into account (colored) light being clipped.

At a step 106 the color mixing system is controlled according to the target color mixing system setting so as to cause the light fixture to emit light having the target color.

"Controlling the color mixing system according to the target color mixing system setting" can include the color mixing system setting is set at the target color mixing system setting, such as via a control device controlling the color mixing system.

A "color mixing system" is an adjustable and controllable system for emitting, from the color mixing system, light having different colors at different color mixing system settings, such as, a first color at a first setting and second color at a second setting. The color mixing system can comprise adjustable optical components for generating different colors, such as a plurality of light sources comprising light sources of different colors or a broadband light source and one or more color filters.

The color mixing system can be controlled by a control device, such as one or more processors optionally operatively coupled with electronics and/or actuators for controlling the optical components, such as controlling a position of color filters in a subtractive color mixing system or controlling relative intensities of differently colored light sources in an additive color mixing system. The control device can be a dedicated control device for controlling the color mixing system or can in some embodiments further control other parts of the light fixture.

A "light fixture" is an electrical device that contains a light source, such as an illumination device or an illumination system with a light source or a luminaire, that provides illumination and wherein the light source and optionally one or more optical components is at least partially enclosed in a housing. In some embodiments, any number of light effects can be integrated into the light fixture. According to some embodiments, a light fixture can include one or more of a prism for prism effects, an iris for iris effects, framing blades for framing effects, frost filter for frost effects, means for dimming effects, animation wheel for animation effects, one or more gobo wheels. The light fixture can be controlled based on an input signal indicative of a desired intensity, light parameters which can be indicative of a target color indicating a desired color of the outgoing light, and/or a number of light effect parameters indicative of a various numbers of light effects. The light fixture can comprise a processor configured to control the different light effects of the light fixture based on the light parameters received by the input signal. For example the light fixture can comprise the light effects and be controlled based on various parameters as described in WO2010/145658 in particular on page 4 line 11-page 6 line 9, which is incorporated herein by reference.

"Light" generally refers to visible electromagnetic radiation, such as electromagnetic radiation with wavelengths within (both endpoints included) 380-780 nm.

A "light source" can be any source capable of emitting light, such as a light emitting diode (LED), a LASER, a high-intensity discharge lamp, LASER activated phosphor and/or an incandescent light source, such as a light bulb with a resistively heated filament.

A "beam clipping system" is arranged either purposively or inadvertently or accidentally—to clip (such as remove, e.g., by absorption/blocking or reflection or diversion) a portion, such as one or more rays, of a beam of light emitted from the one or more light sources so that the portion is not emitted from the light fixture, wherein the portion is spatially and/or angularly variable, and wherein the portion that is being clipped can be controlled according to a beam clipping system setting. The beam system setting can be capable of being set according to at least two or more different values. Examples of beam clipping systems include a zoom system, an iris and/or a gobo. In some embodiments, the beam clipping system can be positioned outside of an object in-focus plane.

A "setting" can refer to a configuration or a position.

Correspondingly, a "beam clipping system setting" corresponds to a setting of the beam clipping system, for example a setting defining a zoom level when the beam clipping system is a zoom system.

A "color mixing system setting" can correspondingly be understood a setting of the color mixing system, for example a setting defining position(s) of one or more color filters in a subtractive color mixing system or a setting defining intensities of light emitted from each group of (differently) colored light sources in an additive color mixing system.

In some embodiments, the color mixing system can be placed before and/or after the beam clipping system on the optical axis (where "after" refers to a direction of light). For example, the light fixture can comprise, in sequence, a plurality of differently colored light sources of an additive color mixing system and thereafter a beam clipping system. Alternatively, the subtractive color mixing system can comprise color filters on either side of the beam clipping system. In another alternative, the light fixture can comprise, in sequence, one or more light sources, a beam clipping system and a subtractive color mixing system.

"Emitted light" refers to light emitted from the light fixture or a part thereof, such as emitting light from a part (only) of the light fixture comprising the color mixing system (and not necessarily having traversed other optical components of the light fixture, such as the beam clipping system), and optionally emitting light from the light fixture (such as leaving the light fixture in its entirety).

Figure 7:
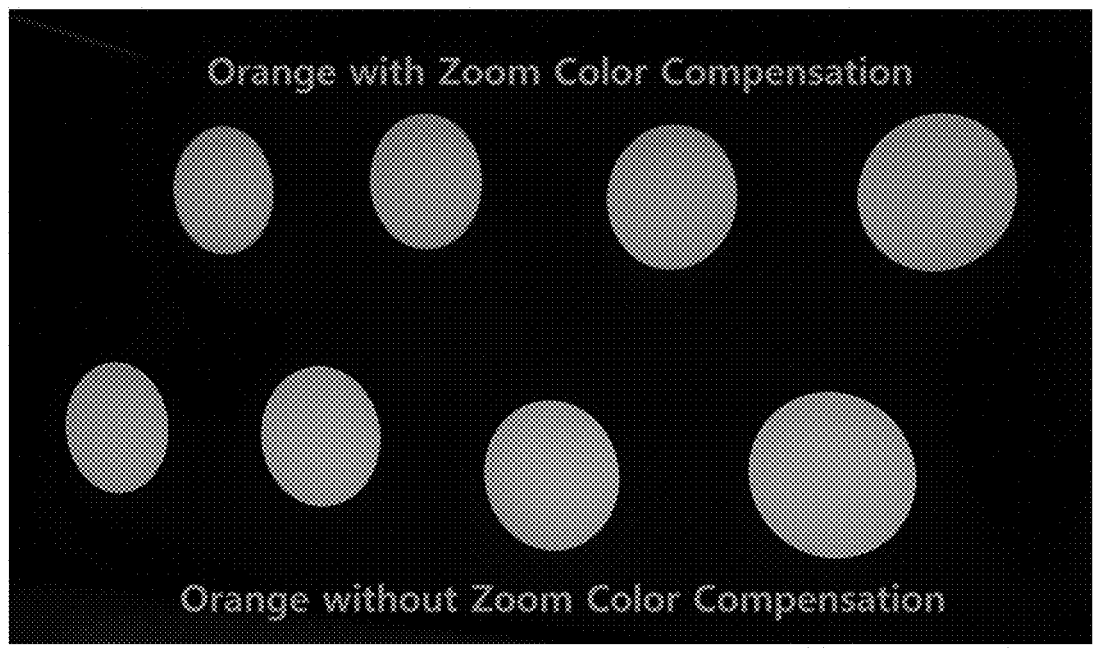
FIG. 7 illustrates light spots on a surface resulting from light fixtures.

FIG. 7 illustrates light spots on a surface resulting from—in the upper row—four light fixtures controlled according to various embodiments, such as with zoom color compensation, and—in the lower row—four light fixtures, wherein the beam system setting has not been taken into account during determining the color mixing system setting, such as without zoom color compensation. The difference in color between the upper row and the lower row goes to show that a visible difference can be provided via the features of one or more embodiments.

Figure 8:
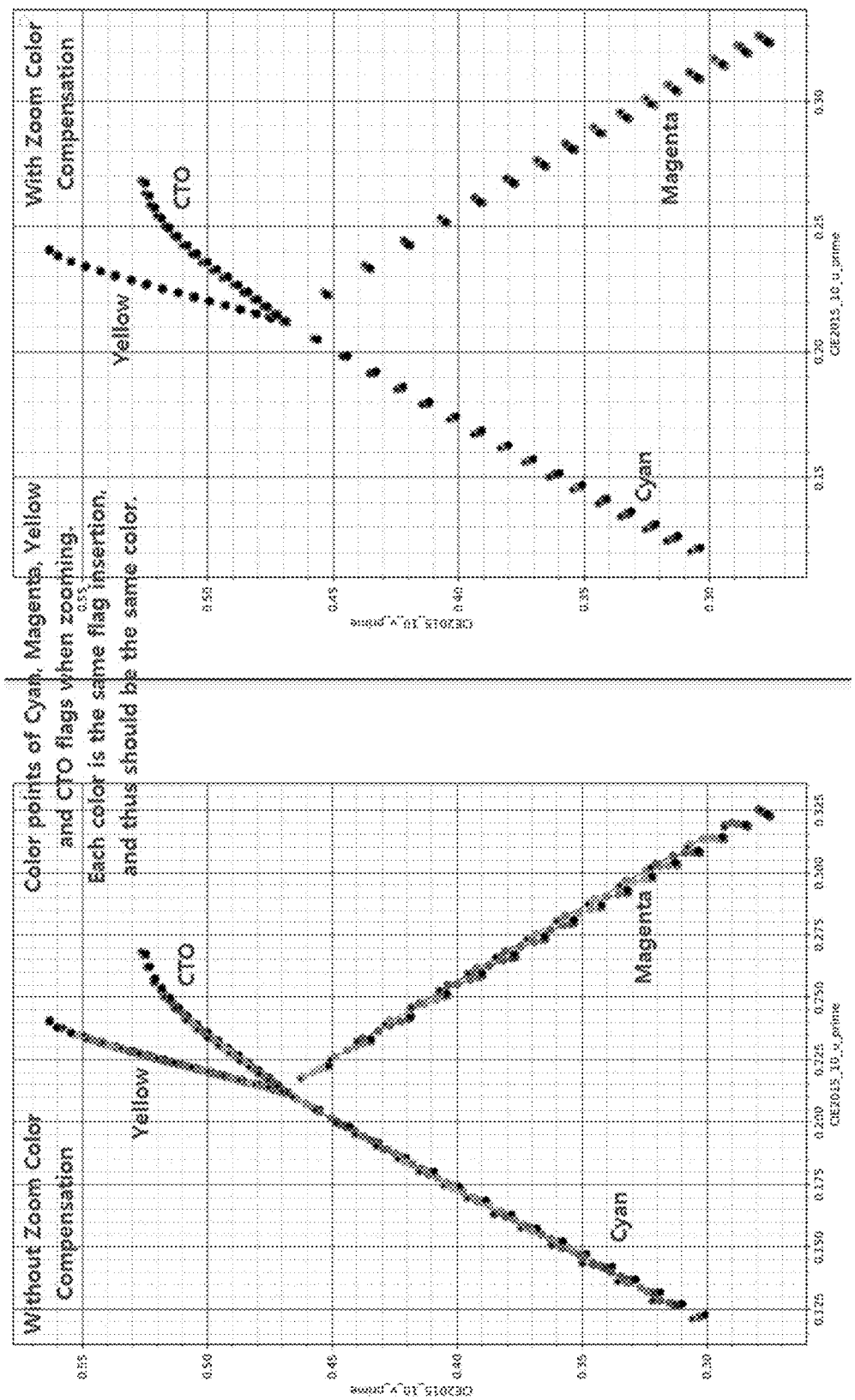
FIG. 8 illustrates CIE color space data.

FIG. 8 shows CIE color space data, such as color points of cyan, magenta yellow and CTO flags when zooming and where each color is the same as the flag insertion and thus should be the same color, obtained (in the right side) for a light fixture according to various embodiments with a zoom system, wherein a zoom setting has been taken into account during determining the color mixing system setting, such as wherein data has been obtained with zoom color compensation, and (in the left side) a light fixture wherein a zoom setting has not been taken into account during determining the color mixing system setting, such as wherein data has been obtained without zoom color compensation. The data in the right side are presented almost as points, which each correspond to a color filter setting, respectively, for a cyan color filter, a magenta color filter, a yellow color filter, and a CTO (color-temperature-orange) color filter, and wherein a zoom level has been changed. Although there might be a small (sideways) shift in hue with zoom level changing, the light properties are almost stable, hence forming the point-like presentation. As opposed hereto, the data in the left side are not confined to points, which is due to the color changing—even for fixed color filter (color flag) position—with zoom level, hence the data potted for a fixed color filter setting draws a line in the CIE color space. This is particularly pronounced for color filter settings wherein the flag is neither fully in nor fully out of the beam, i.e., the data between the endpoints of each line of data.

Figure 9:
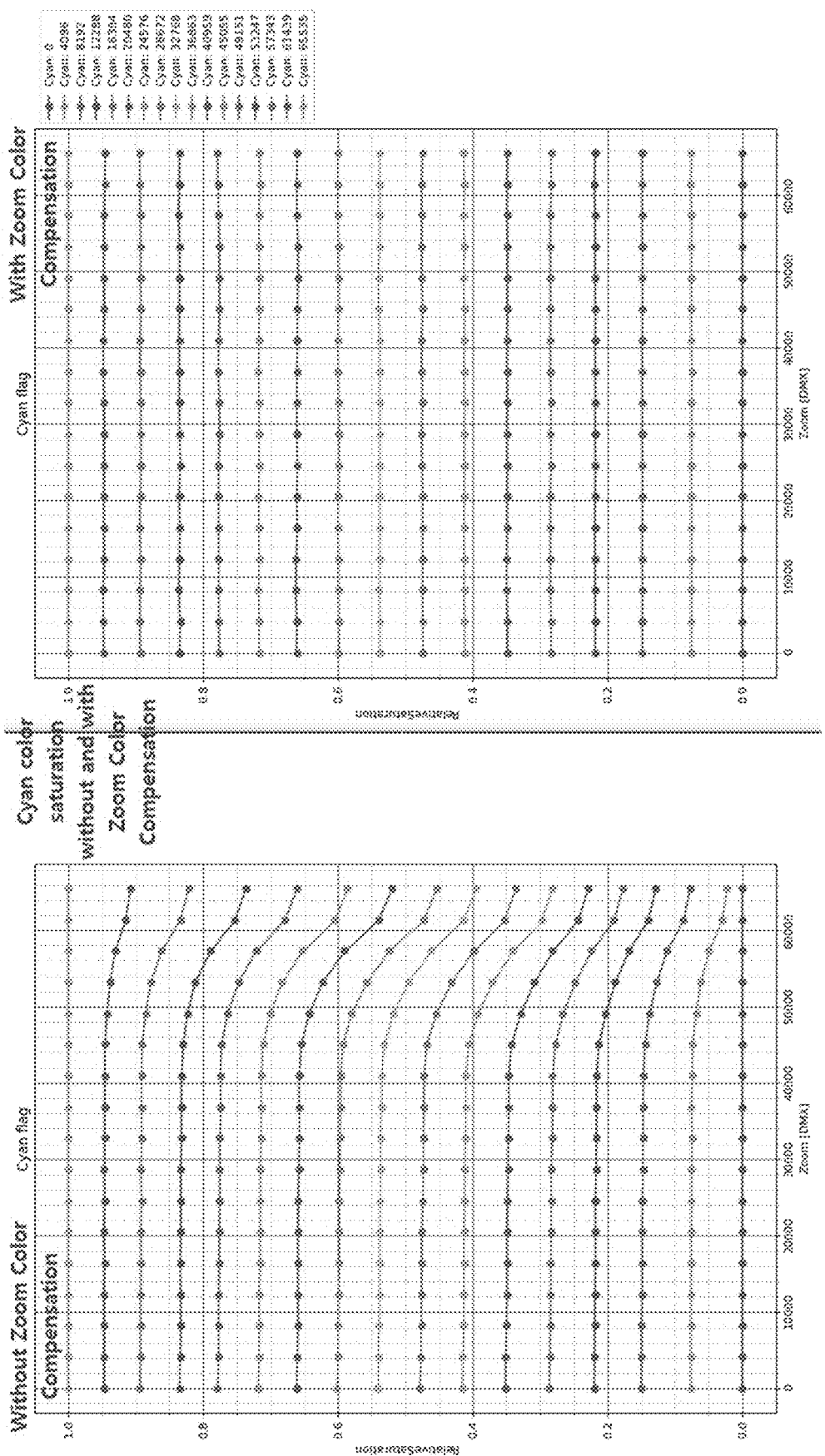
FIG. 9 illustrates diagrams with relative saturation of light as a function of zoom setting.

FIG. 9 illustrates relative saturation of light obtained (in the right side) for a light fixture according to various embodiments with a zoom system, such as cyan color saturation without and with zoom color compensation, wherein a zoom setting has been taken into account during determining the color mixing system setting, such as wherein data has been obtained with zoom color compensation, and (in the left side) a light fixture wherein a zoom setting has not been taken into account during determining the color mixing system setting, such as wherein data has been obtained without zoom color compensation. In each case, the horizontal first axis shows increasing zoom level and the vertical second axis shows relative saturation, with each line representing a target saturation, which is achieved in both the left side and the right side at zoom level being zero. The data in the left side shows that a target saturation is achieved for zero zoom level (the data points on the left side in the coordinate system), for color filter being completely outside of the light beam (for the lowest line with zero saturation) and/or for the color filter being completely in the beam (for the topmost line with relative saturation 1.0). The sequence in the legend from top-to-bottom is the opposite of the sequence in each diagram. For zero zoom level, there is no beam clipping. With the color filter completely out of or in the beam, the coloring of the beam is homogeneous. However, for high zoom levels and the color filter only partially in the beam (corresponding to the area of the coordinate system in the middle of the right side), the figure shows that the saturation starts declining below the target saturation, which is due to the portions of the light beam which is colored by the partially inserted color filter is also (at least to an unproportionally large extent) the portion being clipped by the zoom system. The data in the right side shows almost constant saturation due the zoom level being taken into account during determining the color mixing system setting, which in practice can mean re-positioning the color filter further into the beam to compensate for the colored light being clipped.

In other words, FIG. 9 shows that light being clipped in a beam clipping system, such as a zoom system, might differ spectrally from the light not being clipped and thus eventually emitted from the light fixture. This is the case in the present example where color filters are partially inserted in the light beam within a subtractive color system and thus inhomogeneously colors the light beam within the light fixture. In consequence, a spectral distribution, or color, of light being emitted from the light fixture depends on the beam clipping system setting, i.e., whereas a color mixing system setting has been chosen in pursuit of emitting light having a target color from the light fixture, then due to the beam clipping system at some settings clipping some of the light responsible for coloring the light emitted from the light fixture, the remaining emitted light after clipping has another color. By determining a target color mixing system setting based on the target information, and the beam clipping system setting, thereby duly taking this effect into account and compensating therefore, it is possible to stably emit light from the light fixture having the target color across beam clipping system settings, such as across all beam clipping system settings.

This can be advantageous for enabling utilizing a beam clipping system, which would otherwise cause changes in color of light emitted from the light fixture and/or for dispensing with a need for other components for mitigating said problem and furthermore provides a simple and/or cost-effective solution, which solution may be applicable for retrofitting via software updates. Another possible advantage can be that it is enabling emitting light with a color closer to the target color for more, such as all, beam clipping system settings.

According to some embodiments, there is presented a method, wherein the beam clipping system comprises an optical system, such as a zoom system, wherein a divergence and/or a beam size (such as diameter), is changed by the beam clipping system depending on beam clipping system setting.

According to some embodiments, there is presented a method, wherein the beam clipping system comprises one or more refractive elements, wherein a position and/or a focal length of one or more of the refractive elements depend on beam clipping system setting.

According to some embodiments, there is presented a method wherein the beam clipping system comprises a single optical element, such as a lens, which single optical element is movable and/or has adjustable position and/or adjustable focal length. This can, in particular, be advantageous for a wash light fixture.

According to some embodiments, there is presented a method wherein there are multiple beam clipping systems and wherein the method comprises determining a target color mixing system setting based on the target information, and the beam clipping system settings (for the plurality of beam clipping systems).

According to some embodiments, there is presented a method wherein the beam clipping system is a zoom system and the beam clipping system setting is a zoom setting for controlling a zoom level of the zoom system, such as the zoom system being a variable zoom system wherein a zoom level is controlled according to the beam clipping system setting being a zoom setting. A "zoom system" can be an optical system, such as a lens system, which can change a focal length, such as change the focal length with an image plane fixed. In some embodiments, the zoom system can comprise a plurality of lenses, such as at least 2, 3, 4, or more lenses.

According to some embodiments, there is presented a method wherein the zoom system comprises at least one of: One or more lenses with an adjustable focal length; or a plurality of lenses distributed and spaced apart along an optical axis of the light fixture and wherein one or more lenses of the plurality of lenses has an adjustable position along the optical axis of the light fixture. An advantage of this can be that the adjustable focal length enables focusing at different distances.

According to an embodiment, there is presented a method wherein the beam clipping system is arranged to at least partially clip a portion, such as a variable portion, of a beam of light emitted from one or more light sources via vignetting, such as mechanical vignetting or optical vignetting, such as wherein the beam clipping system is a zoom system and the beam clipping system setting is a zoom level and a degree of optical vignetting depends on the zoom level. "Vignetting" can include techniques used to decrease an amount of light transmitted through an optical system with distance from the optical axis. Vignetting can affect the color of light emitted from the light fixture, e.g., if the color mixing system results in a beam which varies spectrally with distance from the optical axis for at least some angles, which can be the case when color filters (or flags) are inserted into the beam in a subtractive color mixing system.

According to some embodiments, there is presented a method wherein the color mixing system is a subtractive color mixing system comprising one or more color filters, such as one or more adjustable color filters, such as one or more spatially adjustable color filters and wherein the color mixing system is optionally controlled by a control device for adjusting, such as controlling position(s) of, the one or more adjustable color filters. "A subtractive color mixing system" can include a system for partially or fully inhibiting conveying, such as transmitting (along the optical path) or reflecting (along the optical path), spectral parts of incident light, i.e., subtracting partially or fully one or more certain spectral parts (corresponding to the spectral parts not conveyed along the optical path). In embodiments, the one or more subtractions are realized by inserting, such as gradually inserting, one or more, such as three or more, such as four or more, subtractive color filters into the optical path, such as wherein the subtractive color mixing system is arranged for inserting independently of each other three subtractive tristimulant color filters in varying degrees (such as the subtraction being in varying degrees, such as gradually increasing degrees) into the optical path. According to some embodiments, a filter set of three primary colors (with colors being the transmitted colors in case of incident white light) is arranged to perform such color mixing, such as red, green and blue color filters (RGB) or cyan, magenta and yellow color filters (CMY).

According to some embodiments, there is presented a method wherein the subtractive color mixing system comprises one or more spatially adjustable color filters, which according to one or more color mixing system settings affects a color of only part of a light beam incident on the beam clipping system, such as rendering a color of the beam of light incident on the beam clipping system spatially inhomogeneous. A "subtractive color filter" can include a color filter which can be qualitatively or quantitatively inserted into a light beam and prohibit transmission of some or all light in the light beam within a certain range of wavelength, while allowing light having other wavelengths to pass (at least to a larger degree). In some embodiments, the subtractive color mixing system comprises one or more subtractive color filters in the form of dichroic filters. In high intensity light projectors such as are used for example in the entertainment and architectural lighting industries, the brightness of the light sources required is too high to use absorptive color filters for coloring the light beam. So called dichroic filters are used instead which reflect the complementary color of color passed through the filter. Such filters display an extremely small absorption and are able to withstand the high ambient temperature and high intensity light throughput which are characteristic of such projectors. In some embodiments, each of the subtractive color filters, such as within the plurality of subtractive color filters, is adjustable, such as quantitatively adjustable.

According to some embodiments, there is presented a method, wherein the color mixing system is an additive color mixing system comprising a plurality of light sources being spectrally different from each other, such as wherein the color mixing system is optionally controlled by a control device for adjusting, such as controlling relative intensities of light emitted from, the plurality of light sources. For example, LEDs can be provided as colored LEDs emitting light having a relatively narrow spectral bandwidth and thus emitting light of a single color, wherein light generated by these LEDs are combined into an outgoing light beam. The intensity of each color can be adjusted relatively to each other whereby the color of the outgoing light beam can be varied as known in the art of additive color mixing. Thereby any color within the color gamut defined by the color of the LEDs can be created. Typically, this kind of additive color mixing system include red LEDs, green LEDs and blue LED and are known as RGB additive color mixing systems. These RGB lighting products can produce red, green, and blue by turning the LED of only one color on while turning the remaining colors off. Further these RGB products can produce white light by turning all colors on (and approximately at the same specific relative intensities) at the same time. RGBW LED based lighting products or other combinations of different colors (amber, lime, cyan, etc.) can also be provided, where a number of single color LEDs and a number of white LEDs are combined, are also provided in order to be able to create different colors using additive color mixing and to improve the CRI and the efficacy of the white light.

According to some embodiments, there is presented a method, wherein the additive color mixing system comprises a plurality of light sources being spectrally different with respect to each other and arranged so that spectrally different light is spatially and/or angularly inhomogeneously distributed in a plane orthogonal to the optical axis of the light fixture, such as wherein a position of said plane being within and/or co-incident with a position of the beam clipping system and/or such as rendering a color of the beam of light incident on the beam clipping system spatially inhomogeneous. The light sources need not be confined to being placed physically in a plane and can, for example, be placed on a curved surface.

According to some embodiments (such embodiments with beam clipping system being arranged subsequent to the color mixing system on the optical axis), there is presented a method wherein the beam clipping system is configured so that at least for one or more combinations of the beam clipping system setting and the color mixing system setting, a portion of the beam of light emitted from one or more light sources which is being clipped by the beam clipping system is spectrally different with respect to the remaining portion of the beam of light, such as wherein the beam clipping system is positioned at a position along the optical axis of the light fixture wherein a color of the beam of light incident on the beam clipping system is spatially inhomogeneous, and such as wherein a color of the portion of the beam of light emitted from the one or more light sources which is being clipped by the beam clipping system is non-representative with respect to a color of the beam of light incident on the beam clipping system.

According to some embodiments (such as embodiments with beam clipping system being arranged in front of the color mixing system on the optical axis), there is presented a method wherein the beam clipping system is arranged so that at least for one or more combinations of beam clipping system setting and color mixing system setting, the portion of the beam of light emitted from the one or more light sources which is being clipped by the beam clipping system would in the absence of the beam clipping system have been spectrally different with respect to the remaining portion of the beam of light upon being emitted from the light fixture, such as wherein the portion of the beam of light emitted from the one or more light sources which is being clipped by the beam clipping system would (in the absence of the beam clipping system) have been colored by a subsequent color mixing system so as to be non-representative with respect to a color of the beam of light actually emitted from the light fixture.

It may generally be understood that each of the color mixing system and the beam clipping system can each affect, the color and/or the clip of the light beam in an inhomogeneous manner, and that these inhomogeneities are related to each other so that different parts of the beam are affected disproportionally with respect to each other. For example, a subtractive color filter can in a specific color mixing system setting come in from the side of the beam and serve to color only a segment, such as a circular segment of a circular beam with a height H being substantially smaller than a beam radius R. Subsequently, a beam clipping system can be arranged for substantially clipping only an outer portion of the beam, such as an annulus between radial positions R and R-H. In that case, each system affects the beam inhomogeneously, and the result is that the colored portion and the non-colored portion is affected disproportionally because all of the (segment, such as circular segment) colored portion of the beam has been clipped while only a fraction of the ("capped circle") non-colored portion of the beam has been capped. In effect, the clipping systems thus affects a balance between colored and non-colored light (which balance, however, can be restored by taking the beam clipping system into account and re-adjusting the color filter so as to color a larger portion of light, which is not clipped). While the beam clipping system in this example is subsequent to the color mixing system, the general issue could have been similar for a situation with beam clipping system prior to the color mixing system.

According to some embodiments, there is presented a method wherein for one or more combinations of the beam clipping system setting and the color mixing system setting, there is a difference between a color of a beam of light incident on the beam clipping system and a color of light emitted from the light fixture; and for a given color mixing system setting the difference can vary with the beam clipping system setting. Due to the difference in color, the beam clipping system affects the color of light emitted from the light fixture, yet this can advantageously be carried out in a controlled (such as compensated) manner due to the dependency of the target color mixing system setting based on the beam clipping system setting.

According to some embodiments, there is presented a method wherein for at least two different pairs of settings of the color mixing system setting and the beam clipping system setting, a difference in a color of light emitted from the light fixture according to the different pairs of settings, is smaller than it would have been if the color mixing system setting had been identical in the different pairs of settings. In some examples, each pair of settings is selected in pursuit of the same target color. Thus, for different beam clipping system settings, a smaller difference in color is achieved by changing color mixing system setting compared to keeping color mixing system settings constant. This can for example be due to a target color being achieved at a first pair of settings, whereas a beam clipping system setting at the second pair of settings goes to clip a colored part of the light beam within the light fixture, which colored part would have been needed in the light emitted from the light fixture had it not been for the dependency of the target color mixing system on the beam clipping system, which can be used to compensate and add the otherwise missing color to the light emitted from the light fixture. A distance (including a zero distance) between colors can be calculated by CIEDE2000, cf., ISO/CIE 11664-6:2014, Colorimetry—Part 6: CIEDE2000 Color-difference formula.

According to some embodiments, there is presented a method wherein determining the target color mixing system setting is further based on calibration data. "Calibration data" can include data, such as measured data, with corresponding values of on the one hand sets of control setpoints (such as wherein each set comprises a control setpoint for a color mixing system setting and a beam clipping system setting, wherein for example the color mixing system setting can comprise a plurality of sub-setpoints, such as a setpoint for each of a plurality of color filters and/or group of light sources of a particular color) and on the other hand colors and/or spectra (of light emitted by the light fixture). An advantage of calibration data can be that it can ensure precision with respect to the color of the light emitted from the light fixture achieving the target color and/or that it enables a simple and/or efficient means for determining the target color mixing system setting.

According to some embodiments, there is presented a method wherein the calibration data is indicative of a color of light emitted from the light fixture for a plurality of coordinates in a multi-dimensional space spanned by the color mixing system setting and the beam clipping system setting. Each coordinate can define a particular set of settings of the beam clipping system and the color mixing system, such as unambiguously defining the settings of the beam clipping system and the color mixing system, and linking each coordinate to a color of the light emitted from the light fixture (such as wherein different coordinates can be linked to substantially the same color, such as the same color, of light emitted from the light fixture). A possible advantage of including both color mixing system setting and beam clipping system setting in the calibration data can be that it enables taking both into account in a precise, simple and/or efficient manner.

According to some embodiments, there is presented a method wherein the calibration data comprises is indicative of a color of light emitted from the light fixture for a plurality of N coordinates, with N being 3 or more, such as 4 or more, such as 5 or more, such as 6 or more, such as 8 or more, such as 10 or more, such as 30 or more, such as 100 or more, such as 200 or more, such as 300 or more, such as 500 or more, such as 750 or more, such as 1000 or more. In some embodiments, an advantage of having a relatively high number of (calibration) coordinates can be increased precision in terms of achieving the target color with light emitted from the light fixture.

According to some embodiments, there is presented a method wherein a number of possible beam clipping system settings is 2 or more, such as 3 or more, such as 4 or more, such as 5 or more, such as 6 or more, such as 8 or more, such as 10 or more, such as 30 or more, such as 50 or more, such as 75 or more. In some embodiments, an advantage of having multiple possible beam clipping system settings is the possible variation.

According to some embodiments, there is presented a method wherein a number of possible beam clipping system settings is 3 or more, such as 4 or more, such as 8 or more, such as 16 or more, such as 32 or more.

According to some embodiments, there is presented a method wherein a number of possible beam clipping system settings is 64 or more, such as 200 or more, such as 256 or more, such as 300 or more, such as 500 or more, such as 750 or more, such as 1000 or more, such as 64000 or more. In some embodiments, an advantage of having a relatively large number of possible beam clipping system settings is the possible variation, and optionally a finer resolution, such as more options between extreme settings. Calibration data can not necessarily be carried out for all possible beam clipping system settings. According to one example, a number of possible beam clipping system settings is 256 with calibration data having been obtained, such as measured for 16 beam clipping system settings, and an expected color of light emitted from the light fixture for the remaining beam clipping system settings being estimated therefrom, such as calculated via interpolation.

According to some embodiments, there is presented a light fixture system further comprising a converting material configured to convert at least a part of light emitted from the one or more light sources into converted light wherein a wavelength of the converted light is different with respect to a wavelength of light emitted from the one or more light sources, such as wherein said converting material is a phosphor material. In such a light fixture, the converting material can affect a color of light emitted from the light fixture depending on the beam clipping system setting due to a varying (depending on the beam clipping system setting) amount of light reflected by the beam clipping system back into the converting material, which in turn emits colored light, which then colors the light emitted from the light fixture, yet in the light fixture according to the present embodiment, this effect can advantageously be dealt with in a controlled (such as compensated) manner due to the dependency of the target color mixing system setting based on the beam clipping system setting.

According to some embodiments, there is presented a light fixture system wherein the light fixture system is a moving head. A moving head can be understood to be a system comprising a light fixture and further comprising rotating means, such as actuators, for rotating a direction of light emitted from the light fixture around one or two axes being orthogonal to the direction of light emitted from the light fixture. An example of such embodiment can be given by a moving head, such as described in WO2010/145658A1 (see for example FIGS. 1-2 and accompanying description), which is incorporated by reference herein.

According to some embodiments, there is presented a light fixture system, such as a moving head, comprising one or more actuators, such as electric motors, such as stepper motors and/or servo motors, for changing a direction of light emitted from the light fixture, such as for rotating a direction of light emitted from the light fixture around one or two axes being orthogonal to the direction of light emitted from the light fixture. A possible advantage is that the direction of light can be changed in an automated manner, which can in particular be relevant for, e.g., theatre lighting, e.g., for stage performances. An example of such embodiment can be given by a moving head, such as described in WO2010/145658A1 (see for example FIGS. 1-2 and accompanying description), which is incorporated by reference herein.

According to some embodiments, there is presented a light fixture system wherein the plurality of light sources are capable of delivering in total at least 5 klm, such as at least 10 klm, such as at least 20 klm, such as at least 30 klm, such as at least 40 klm.

According to some embodiments, there is presented a light fixture system wherein a luminance of each light source of one or more light sources is above 250 $lm/mm^2$, such as above 300 $lm/mm^2$, such as above 400 $lm/mm^2$, such as above 450 $lm/mm^2$, such as above 500 $lm/mm^2$. According to some embodiments, there is presented a light fixture wherein a luminance of the second group of light sources can be driven above 250 $lm/mm^2$, such as above 300 lm/mm², such as above 400 lm/mm², such as above 500 lm/mm². For, e.g., profile light or other Etendue limited applications, source luminance can be important and relevant for how high an output can be reached for a certain size fixture. Luminance is understood to be for DC operation (not flash) and measured in lumen (lm) per square millimeter (mm²).

According to some embodiments, there is presented a method of manufacture wherein obtaining the calibration data comprises measuring, estimating and/or calculating the color of light emitted from the light fixture for a plurality of coordinates in a multi-dimensional space spanned by color mixing system setting and beam clipping system setting.

At least one technical advantage of the disclosed techniques relative to the prior art is that, with the disclosed techniques, changes in a color of light emitted from a light fixture that would otherwise result from adjustments of a beam clipping system setting, such as adjustments of a zoom level, can be reduced, minimized, or eliminated. The disclosed techniques further allow existing lighting systems to correct for the color changing effects of the clipping by updating the control of an existing color mixing system and without having to add additional components. These technical advantages represent one or more technological improvements over prior art approaches.

1. In various embodiments, a method for controlling a color of light emitted by a light fixture comprises receiving target information indicative of a target color of light emitted from the light fixture; receiving a beam clipping system setting for a beam clipping system, wherein the beam clipping system is configured to clip a portion of a beam of light; determining a target color mixing system setting based on the target information and the beam clipping system setting; and controlling a color mixing system according to the target color mixing system setting so as to cause the light fixture to emit light having the target color.

2. The method of clause 1, wherein the beam clipping system is a zoom system and the beam clipping system setting is a zoom setting for controlling a zoom level of the zoom system.

3. The method of clause 1 or 2, wherein the zoom system comprises at least one of one or more lenses with an adjustable focal length; or a plurality of lenses distributed and spaced apart along an optical axis of the light fixture, wherein one or more lenses of the plurality of lenses has an adjustable position along the optical axis of the light fixture.

4. The method of any of clauses 1-3, wherein the beam clipping system is configured to at least partially clip a portion of a beam of light emitted from one or more light sources via vignetting.

5. The method of any of clauses 1-4, wherein the color mixing system is a subtractive color mixing system comprising one or more color filters.

6. The method of any of clauses 1-5, wherein the subtractive color mixing system comprises one or more spatially adjustable color filters, which according to one or more color mixing system settings affects a color of only part of a light beam incident on the beam clipping system.

7. The method of any of clauses 1-6, wherein the color mixing system is an additive color mixing system comprising a plurality of light sources being spectrally different from each other.

8. The method of any of clauses 1-7, wherein the plurality of light sources are spectrally different with respect to each other and arranged so that spectrally different light is spatially and/or angularly inhomogeneously distributed in a plane orthogonal to an optical axis of the light fixture.

9. The method of any of clauses 1-8, wherein the beam clipping system is configured so that at least for one or more combinations of the beam clipping system setting and the color mixing system setting, a portion of the beam of light emitted from one or more light sources which is being clipped by the beam clipping system is spectrally different with respect to a remaining portion of the beam of light.

10. The method of any of clauses 1-9, wherein for one or more combinations of the beam clipping system setting and the color mixing system setting, there is a difference between a color of a beam of light incident on the beam clipping system and a color of light emitted from the light fixture; and for a given color mixing system setting the difference varies with the beam clipping system setting.

11. The method of any of clauses 1-10, wherein for at least two different pairs of settings of the color mixing system setting and the beam clipping system setting, a difference in a color of light emitted from the light fixture according to the different pairs of settings, is smaller than it would have been if the color mixing system setting had been identical in the different pairs of settings.

12. The method of any of clauses 1-11, wherein determining the target color mixing system setting is further based on calibration data.

13. The method of any of clauses 1-12, wherein the calibration data is indicative of a color of light emitted from the light fixture for a plurality of coordinates in a multi-dimensional space spanned by the color mixing system setting and the beam clipping system setting.

14. The method of any of clauses 1-13, wherein a number of possible beam clipping system settings is 64 or more.

15. In various embodiments, a light fixture system comprises a light fixture comprising one or more light sources configured to emit light; a beam clipping system configured to clip one or more portions of the light emitted by the one or more light sources; and a color mixing system configured to emit light of a variable color. The light fixture system further comprises a control device coupled to the beam clipping system and the color mixing system. The control device is configured to receive target information indicative of a target color of light emitted from the light fixture; receive a beam clipping system setting for a beam clipping system; determine a target color mixing system setting based on the target information and the beam clipping system setting; and control the color mixing system according to the target color mixing system setting so as to cause the light fixture emit light having the target color.

16. The light fixture system of clause 15, further comprising a converting material configured to convert at least a part of light emitted from the one or more light sources into converted light wherein a wavelength of the converted light is different with respect to a wavelength of light emitted from the one or more light sources.

17. The light fixture system of clause 15 or 16, wherein the light fixture system is a moving head.

18. The light fixture system of any of clauses 15-17, wherein the one or more light sources are capable of delivering in total at least 5 klm.

19. The light fixture system of any of clauses 15-18, wherein a luminance of each light source of the one or more light sources is above 250 lm/mm².

20. In various embodiments, one or more computer-readable storage media including instructions that, when executed by one or more processors, cause the one or more processors to perform steps of receiving target information indicative of a target color of light emitted from a light fixture; receiving a beam clipping system setting for a beam clipping system, wherein the beam clipping system is configured to clip a portion of a beam of light; determining a target color mixing system setting based on the target information and the beam clipping system setting; and controlling a color mixing system according to the target color mixing system setting so as to cause the light fixture to emit light having the target color.

Although the present disclosure has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for controlling a color of light emitted by a light fixture, the method comprising:
   receiving target information indicative of a target color of light emitted from the light fixture;
   receiving a beam clipping system setting for a beam clipping system, wherein the beam clipping system is configured to clip different colored portions of a beam of light depending on the beam clipping system setting;
   determining a target color mixing system setting for a color mixing system that is configured to emit light of a variable color based on the target information and the beam clipping system setting; and
   controlling the color mixing system according to the target color mixing system setting so as to cause the light fixture to emit light having the target color.

2. The method of claim 1, wherein:
   the beam clipping system is a zoom system; and
   the beam clipping system setting is a zoom setting for controlling a zoom level of the zoom system.

3. The method of claim 2, wherein the zoom system comprises at least one of:
   one or more lenses with an adjustable focal length; or
   a plurality of lenses distributed and spaced apart along an optical axis of the light fixture, wherein one or more lenses of the plurality of lenses has an adjustable position along the optical axis of the light fixture.

4. The method of claim 1, wherein the beam clipping system is configured to at least partially clip a portion of a beam of light emitted from one or more light sources via vignetting.

5. The method of claim 1, wherein the color mixing system is a subtractive color mixing system comprising one or more color filters.

6. The method of claim 5, wherein the subtractive color mixing system comprises one or more spatially adjustable color filters, which according to one or more color mixing system settings affects a color of only part of a light beam incident on the beam clipping system.

7. The method of claim 1, wherein the color mixing system is an additive color mixing system comprising a plurality of light sources being spectrally different from each other.

8. The method of claim 7, wherein the plurality of light sources are spectrally different with respect to each other and arranged so that spectrally different light is spatially and/or angularly inhomogeneously distributed in a plane orthogonal to an optical axis of the light fixture.

9. The method of claim 1, wherein the beam clipping system is configured so that at least for one or more combinations of the beam clipping system setting and the color mixing system setting, a portion of the beam of light emitted from one or more light sources which is being clipped by the beam clipping system is spectrally different with respect to a remaining portion of the beam of light.

10. The method of claim 1, wherein:
for one or more combinations of the beam clipping system setting and the color mixing system setting, there is a difference between a color of a beam of light incident on the beam clipping system and a color of light emitted from the light fixture; and
for a given color mixing system setting the difference varies with the beam clipping system setting.

11. The method of claim 1, wherein for at least two different beam clipping system settings, and respective corresponding color mixing system settings that are different from one another, a difference in a color of light emitted from the light fixture relative to the target color is smaller than it would have been if the color mixing system setting had been identical for both of the at least two different beam clipping system settings.

12. The method of claim 1, wherein determining the target color mixing system setting is further based on calibration data.

13. The method of claim 12, wherein the calibration data is indicative of a color of light emitted from the light fixture for a plurality of coordinates in a multi-dimensional space spanned by the color mixing system setting and the beam clipping system setting.

14. The method of claim 1, wherein a number of possible beam clipping system settings is 64 or more.

15. A light fixture system comprising:
a light fixture comprising:
one or more light sources configured to emit light;
a beam clipping system configured to clip different colored portions of a beam of the light emitted by the one or more light sources depending on a beam clipping system setting; and
a color mixing system configured to emit light of a variable color; and
a control device coupled to the beam clipping system and the color mixing system;
wherein the control device is configured to:
receive target information indicative of a target color of light emitted from the light fixture;
receive the beam clipping system setting for the beam clipping system;
determine a target color mixing system setting for the color mixing system based on the target information and the beam clipping system setting; and
control the color mixing system according to the target color mixing system setting so as to cause the light fixture emit light having the target color.

16. The light fixture system of claim 15, further comprising a converting material configured to convert at least a part of light emitted from the one or more light sources into converted light wherein a wavelength of the converted light is different with respect to a wavelength of light emitted from the one or more light sources.

17. The light fixture system of claim 15, wherein the light fixture system is a moving head.

18. The light fixture system of claim 15, wherein the one or more light sources are capable of delivering in total at least 5 klm.

19. The light fixture system of claim 15, wherein a luminance of each light source of the one or more light sources is above 250 lm/mm$^2$.

20. One or more non-transitory computer-readable storage media including instructions that, when executed by one or more processors, cause the one or more processors to perform steps of:
receiving target information indicative of a target color of light emitted from a light fixture;
receiving a beam clipping system setting for a beam clipping system, wherein the beam clipping system is configured to clip different colored portions of a beam of light depending on the beam clipping system setting;
determining a target color mixing system setting for a color mixing system that is configured to emit light of a variable color based on the target information and the beam clipping system setting; and
controlling the color mixing system according to the target color mixing system setting so as to cause the light fixture to emit light having the target color.

* * * * *